(12) United States Patent
Gray et al.

(10) Patent No.: US 6,744,556 B2
(45) Date of Patent: Jun. 1, 2004

(54) DISTRIBUTED RAMAN AMPLIFICATION SYSTEM

(75) Inventors: Stuart Gray, Corning, NY (US); Kim Jepsen, Ellicott City, MD (US); Michael Vasilyev, Belle Mead, NJ (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/099,530

(22) Filed: Mar. 14, 2002

(65) Prior Publication Data

US 2003/0011875 A1 Jan. 16, 2003

Related U.S. Application Data

(60) Provisional application No. 60/276,345, filed on Mar. 16, 2001.

(51) Int. Cl.[7] .............................. H01S 3/30; G01B 9/02
(52) U.S. Cl. ................ 359/341.32; 359/134; 359/160; 359/341.31; 359/337.5; 372/3
(58) Field of Search ................... 359/124, 134, 359/160, 341.31, 341.32, 337.5; 372/3

(56) References Cited

U.S. PATENT DOCUMENTS

| | | | |
|---|---|---|---|
| 5,191,628 A | 3/1993 | Bryon | |
| 5,373,385 A | * 12/1994 | Darcie et al. | ............... 359/162 |
| 5,592,282 A | 1/1997 | Hartog | |
| 5,778,014 A | 7/1998 | Islam | |
| 6,252,693 B1 | * 6/2001 | Blauvelt | ............... 359/183 |

OTHER PUBLICATIONS

Stentz et al, OFC '96, vol. 2, pp 16–17, Feb. 1, 1996, abstract only herewith.*
Spectral Broadening of Double Rayleigh Backscattering in a Distributed Raman Amplifier, OFC 2001, Mar. 22, 2001, vol. 1, pp. MA2/1–MA2/3.
Mani et al, Dispersion Compensation Techniques for CATV Lightwave Transmission Systems, OFC '97 Technical Digest, p. 324.

* cited by examiner

*Primary Examiner*—Nelson Moskowitz
(74) *Attorney, Agent, or Firm*—Mary Y. Redman; Svetlana Short

(57) ABSTRACT

In a distributed Raman amplification system, the pump laser and the fiber are chosen so as to have characteristics which result in broadening of the DRBS. For example, with a transmission fiber through which signal light of a wavelength $\lambda_s$ propagates, and having zero dispersion at a wavelength $\lambda_o$; a pump laser producing counterpropagating pump light at a wavelength $\lambda_p$; where $\lambda_p$ and $\lambda_s$ are on opposite sides of the zero dispersion wavelength is used. The transmission fiber may be large effective area fiber. In a Raman amplification system suitable for use in a WDM optical fiber communication system, pump lasers having mode spacing which is less than the optical bandwidth of the signal channel have been found to be advantageous.

9 Claims, 4 Drawing Sheets

DISTRIBUTED RAMAN AMPLIFICATION SYSTEM

CROSS-REFERENCE TO RELATED APPLICATIONS

This application claims the benefit of priority under 35 U.S.C. §119(e) of U.S. Provisional Application Serial No. 60/276,345 filed on Mar. 16, 2001, which is incorporated by reference herein in its entirety.

BACKGROUND OF THE INVENTION

1. Field of the Invention

The present invention relates generally to Raman amplification, and particularly to distributed Raman amplifiers.

2. Technical Background

A typical optical communication system utilizes a plurality of discrete amplifiers situated between lengths of transmission fiber. The discrete amplifiers are usually Erbium doped fiber amplifiers. The distance between the Erbium doped fiber amplifiers is often referred to as the "span length". It has been known that an optical communication system can utilize distributed Raman fiber amplifiers in conjunction with the Erbium doped fiber amplifiers. Distributed Raman fiber amplifiers utilize the transmission fiber as their gain medium. Distributed Raman amplification has been shown to improve the performance of optical communication systems by reducing the effective noise figure (NF) of the inline amplifiers.

When distributed Raman fiber amplifiers are utilized in conjunction with the Erbium doped fiber amplifiers, the number of spans in an optical communication system can be increased. In addition, the span length between the Erbium doped amplifiers can be significantly increased. This enables systems with larger amplifier spacing, longer reach, higher bit rates, or wider bandwidth. These important advantages come from the fact that the communication fiber itself can provide not only signal attenuation, but also, in the presence of a strong pump, signal amplification.

For small Raman gains, the optical signal-to-noise ratio (OSNR) and the effective NF improve with increasing the Raman gain. At higher gains, however, this trend is reversed by the effects of Rayleigh scattering of amplified spontaneous emission (RSASE) and by multipath interference due to the double Rayleigh back scattering of the signal (MPI due to DRBS). As high power pumps, which enable higher Raman gain, become increasingly commercially available, these performance-related limitations on the amount of useful Raman gain become increasingly important.

SUMMARY OF THE INVENTION

One aspect of the invention is a distributed Raman amplification system in which the pump laser or lasers and the fiber have characteristics that result in broadening of the DRBS spectrum. In another aspect, the invention is a Raman amplification system with a transmission fiber through which signal light of a wavelength $\lambda_s$ propagates, and having zero dispersion at a wavelength $\lambda_o$; a pump laser coupled to said fiber and producing pump light at a wavelength $\lambda_p$; where $\lambda_p$ and $\lambda_s$ are on opposite sides of the zero dispersion wavelength (i.e., $\lambda_p < \lambda_o < \lambda_s$).

In another aspect, the invention is such a system wherein the transmission fiber is large effective area fiber.

In another aspect, the invention is a Raman amplification system in which the pump spectral bandwidth is greater than the signal spectral bandwidth.

In another aspect, the invention is a Raman amplification system suitable for use in a WDM optical fiber communication system, which includes a transmission fiber through which signal light propagates, and a pump laser coupled to the fiber, where the pump mode spacing is less than the optical bandwidth of the signal, or where the relationship between pump mode spacing $\Delta v_{pump}$, WDM channel spacing $\Delta v_{sig}$ and optical bandwidth of the signal $B_O$ is such that the inequality $|m\Delta v_{pump} - n\Delta v_{sig}| > B_O$ ceases to be true for $|m|$ and $|n|$ larger than $\Delta v_{sig}/B_O$.

In these various embodiments, the invention is advantageous in that it lessens the amount of system degradation due to DRBS. In certain practical applications, it is possible to lessen DRBS from consideration, and it may be possible to eliminate or nearly eliminate it in some instances.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely illustrative of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
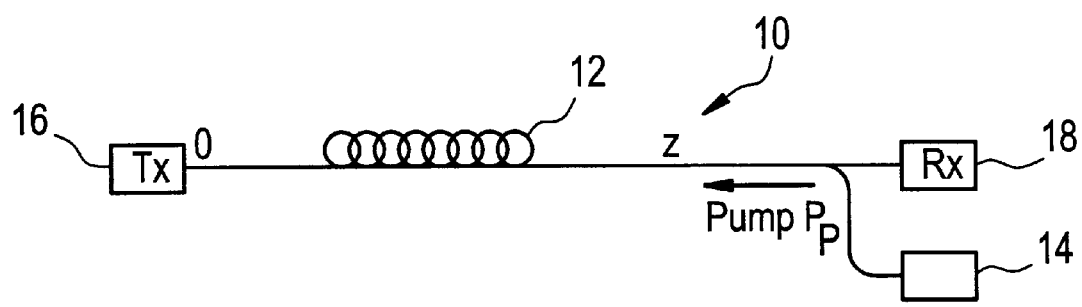
FIG. 1 is a schematic view of a distributed Raman amplifier.

Reference will now be made in detail to the present preferred embodiments of the invention. An illustrative embodiment of the distributed Raman amplifier of the present invention is shown in FIG. 1, and is designated generally by the reference numeral 10. The distributed Raman amplifier includes a fiber 12 which is the transmission fiber in the communication system and also serves as the gain medium, and a pump 14 coupled to the fiber 12, which may be one or more semiconductor lasers, grating stabilized lasers, or other suitable laser light sources. The signal that is to be amplified propagates down the fiber 12 from a transmitter 16 toward a receiver 18. In the illustrated embodiment, the pump signal propagates along the fiber 12 in the opposite direction. The pump signal may come directly from the pump 14 or may be generated in the fiber 12 through cascaded or higher-order Raman amplification. An example of a distributed Raman amplification system is shown in U.S. patent application Ser. No. 09/641,579, filed on Aug. 18, 2000, which is hereby incorporated by reference in its entirety.

For small Raman gains, the optical signal-to-noise ratio (OSNR) and the effective NF improve with increasing the Raman gain. At higher gains, however, this trend is reversed by the effects of Rayleigh scattering of amplified spontaneous emission (RSASE) and by MPI due to DRBS. To improve system performance, it would be desirable to utilize the optimum Raman gain that yields the lowest NF, yet without degrading the system due to RSASE and DRBS. The higher this optimum Raman gain is, the better overall system performance is expected to be.

DRBS is an important factor limiting the amount of Raman benefit in the system. In a typical Raman system with counter-propagating signal and pump, Rayleigh backscattered signal is amplified while co-propagating with the pump, is scattered once again in the direction of the signal, and then is amplified for the second time. Although the amount of double Rayleigh scattering in the fiber is small in the absence of Raman pumping, in the presence of Raman pump it grows quadratically with gain, and MPI crosstalk therefore grows significantly in the presence of Raman pumping. This limits the amount of usable Raman gain in the system.

The following discussion illustrates the effect of the Raman pump spectrum on the DRBS. A typical pump source, e.g., a multi-frequency semiconductor laser, has an optical spectrum width $\Delta v_p$ and a coherence time $\tau = 1/\Delta v_p$. The Rayleigh scattered (or double scattered) signal, in the absence of Raman gain, has the same optical spectrum as the original signal, with spectral width of $\Delta v_s$. A time-dependent pump with intensity variations of duration $\tau_p$ causes the Raman gain to vary in time correspondingly. This time-dependent instantaneous gain modulates the Rayleigh backscattered power of the signal, which co-propagates with the pump light. In addition, pump intensity variations change the refractive index of the fiber through the Kerr non-linearity, thereby imposing time dependent phase variations on the signal (cross-phase modulation). Depending on the relative group velocity of the pump and the scattered signal, one can identify two limiting cases.

In the first case, their group velocities are the same (or their walk-off over the effective length of the fiber, $\tau_{walk-off} = L_{eff}|1/v_p - 1/v_s|$, (where $v_p$ and $v_s$ are group velocities for the pump and the signal, respectively) is much smaller than the pump coherence time $\tau_p$); then the spectrum of the amplified Rayleigh back-scattering is related to the convolution of the signal and the instantaneous gain and phase modulation spectra.

In the second case, their group velocities are quite different (i.e. their walk-off $\tau_{walk-off}$ over the effective length of the fiber is much greater than the pump coherence time $\tau_p$). In this case, the effective net Raman gain and non-linear phase shift are determined by averaging the instantaneous pump power over many variations, each of duration $\tau_p$ and the spectrum of the amplified Rayleigh back-scattering remains practically identical to the original signal spectrum. The spectrum does not change after the second Rayleigh scattering, because then it counter-propagates with the pump and, therefore, experiences Raman gain averaged over many pump intensity variations.

Thus, we can see that in the second case the degradation of the signal quality owing to DRBS multi-path interference is worse, since all the DRBS power falls into the signal (and, therefore, receiver's) bandwidth. In the first case, on the other hand, by properly choosing the spectral parameters of the pump, one can achieve the spreading of the DRBS spectrum over a wide bandwidth. In the case of a single-channel system, DRBS impact can be nearly eliminated as a practical matter by increasing the spreading. In WDM systems, it is undesirable to spread the DRBS power of a particular channel into the bandwidth occupied by other channels. In this case the signal-DRBS crosstalk can be improved by a factor as high as the ratio of the channel spacing to $\Delta v_s$.

This mechanism similarly broadens other signals (e.g., stimulated Brillouin scattering) that initially co-propagate with the pump, and then couple into the opposite direction, thereby reducing their systems impact.

The following are methods for reduction of scattering-induced crosstalk in Raman amplifiers:

Under certain conditions, using a wide-band Raman pump broadens the spectrum of the scattered signal, which moves most of scattered power out of signal band, thereby reducing the amount of in-band crosstalk. Since this decreases the overlap of DRBS with the signal, it can reduce system signal degradation due to DRBS MPI.

The increment in the spectral width is related to the lesser of pump bandwidth $\Delta v_p$ (or, bandwidth of instantaneous gain) and the inverse of walk-off of the pump and signal, $1/\tau_{walk-off}$.

The pump laser (or lasers) and the transmission fiber in which the Raman amplification is to be implemented may be chosen so as to have characteristics which increase broadening of the DRBS. For example, to maximize the broadening effect, one can reduce the walk-off by manipulating the fiber dispersion properties/map and/or by optimizing the position of the pump wavelength to achieve a minimum group velocity mismatch with the signal. In particular, the walk-off vanishes when the pump and the signal are located symmetrically on opposite sides of the zero-dispersion wavelength of the fiber. With a transmission fiber through which signal light of a wavelength $\lambda_s$ and frequency $v_s$ propagates, and having zero dispersion at a wavelength $\lambda_o$ corresponding to a frequency $v_0$; and a pump laser coupled to said fiber and producing pump light at a wavelength $\lambda_p$ and frequency $v_p$; where $\lambda_p$ and $\lambda_s$ are on opposite sides of the zero dispersion wavelength (i.e., $\lambda_p < \lambda_o < \lambda_s$), and $v_s$ and $v_p$ may advantageously be symmetrically spaced from the zero-dispersion frequency $v_0$.

Large effective area fiber such as that available from Corning Incorporated under the trademark LEAF® is advantageous in that it has zero-dispersion wavelength between that of commercially available lasers which would be suitable for use as Raman pumps and that of signal wavelengths for at least C-bands and L-bands. Alternatively, other combinations of fiber types and pump lasers may be chosen so as to have a DRBS broadening effect. For a given pump source and signal, one of skill in the art could design a fiber having zero dispersion at a desired wavelength between, and preferably, in the center of the interval between, pump wavelength and signal wavelength.

Figure 2:
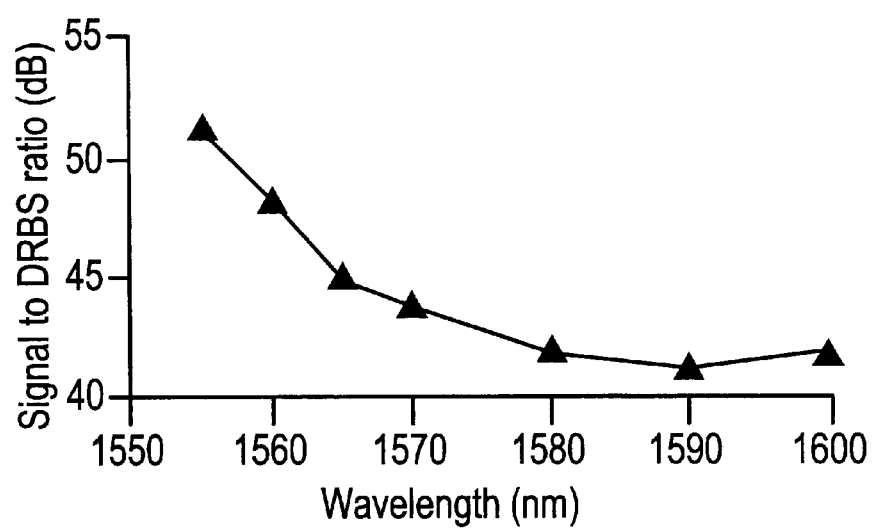
FIGS. 2 through 5 are graphs of data illustrating certain principles behind an embodiment of the invention.
Figure 3:
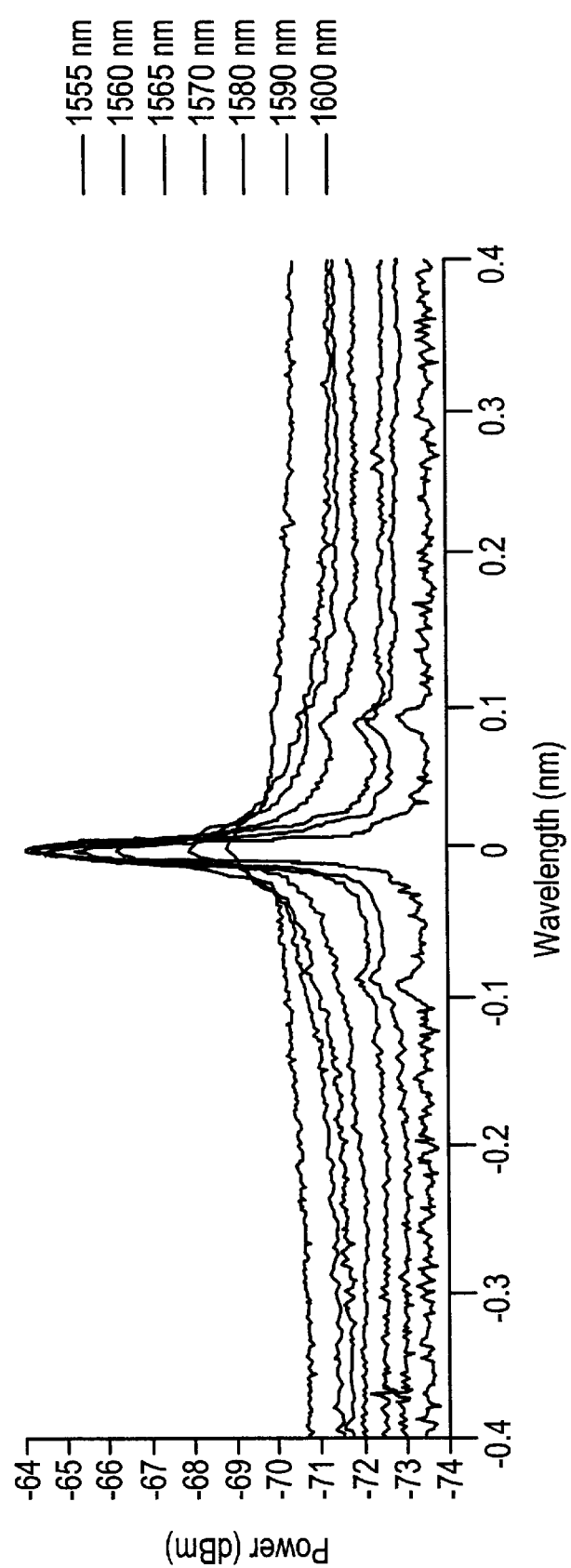

These concepts are illustrated by experimental data shown in FIGS. 2, 3, 4 and 5. The data in FIGS. 2 and 3 were obtained in LEAF® large effective area fiber, with a 1486 nm Raman pump and 22 dB of Raman gain. FIG. 2 is a plot of the ratio of signal and DRBS powers collected from 0.01 resolution bandwidth at different signal wavelengths. FIG. 3 is a plot of DRBS spectra at different signal wavelengths. In this plot, zero on the horizontal axis corresponds to the center wavelength of the signal spectrum. At shorter signal wavelengths, the pump wavelength $\lambda_p$ and the signal wavelength $\lambda_s$ become more symmetric about the zero dispersion wavelength $\lambda_o$ (about 1500 nm for the LEAF® fiber used in this example), and their walk-off decreases. This results in broadening of the DRSB spectrum, as shown in FIG. 3 and, consequently, improvement in the in-band cross-talk as shown in FIG. 2.

Figure 4:
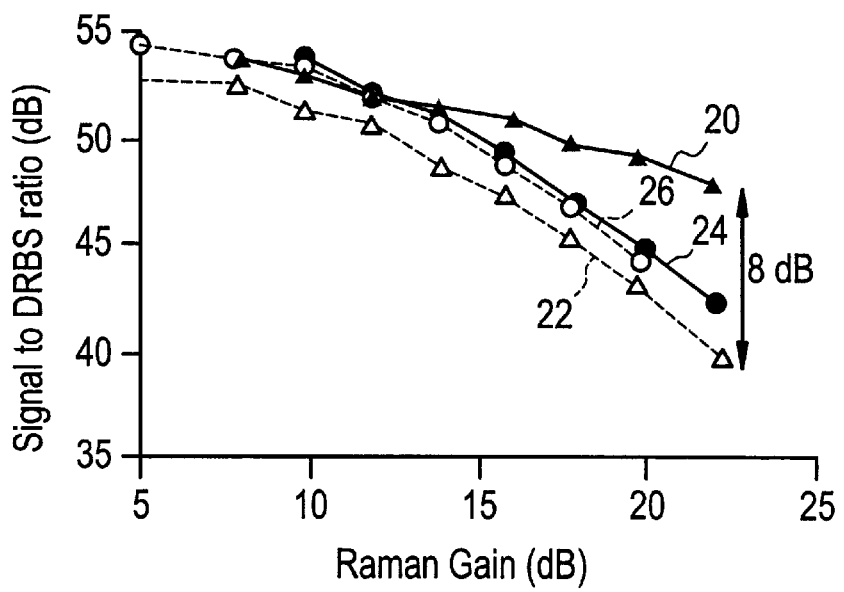
Figure 5:
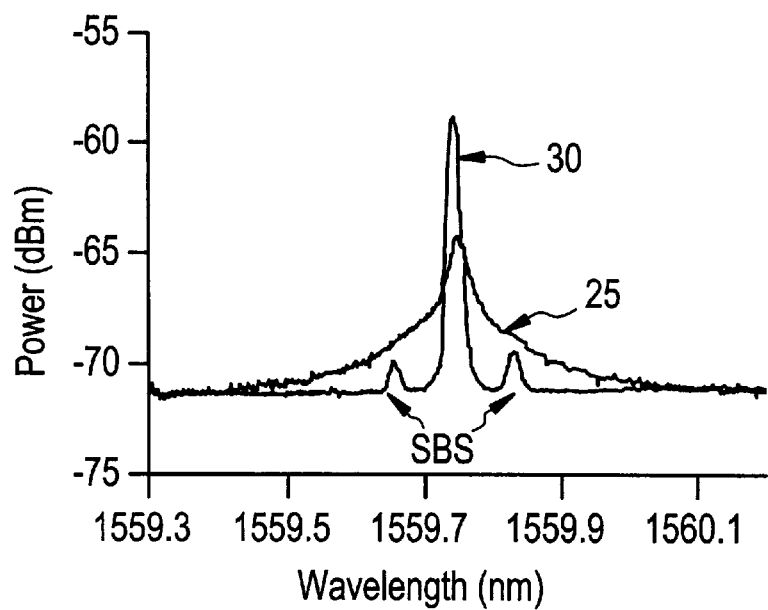

FIG. 4 is a plot of the ratios of signal and DRBS powers in commercially available large effective area (large $A_{eff}$) fiber and SMF fiber, with measurements taken at two different resolution widths. Curves 20 and 22 are the plots for large $A_{eff}$ fiber at 0.01 and 1 nm resolutions, respectively. Curves 24 and 26 are the plots for SMF fiber at 0.01 and 1 nm resolutions, respectively. In FIG. 5, curve 28 is a plot of the DRBS spectrum for large $A_{eff}$ fiber, and curve 30 is a plot of the DRBS spectrum for the SMF fiber. Compared to 1 nm resolution (curve 22), in FIG. 4 one can see up to 8 dB of improvement in cross-talk for 0.01 nm (curve 20) resolution in large $A_{eff}$ fiber. This is the result of DRBS spectral broadening. The zero dispersion wavelength $\lambda_{0smf}$ for the SMF fiber is about 1310 nm. Both the pump wavelength $\lambda_p$ (1486 nm) and the signal wavelength (1560 nm) are on the same side of $\lambda_{0smf}$. As can be seen by a comparison of curves 18 and 20 in FIG. 5, broadening in the SMF fiber is inhibited by considerable walk-off.

Figure 6:
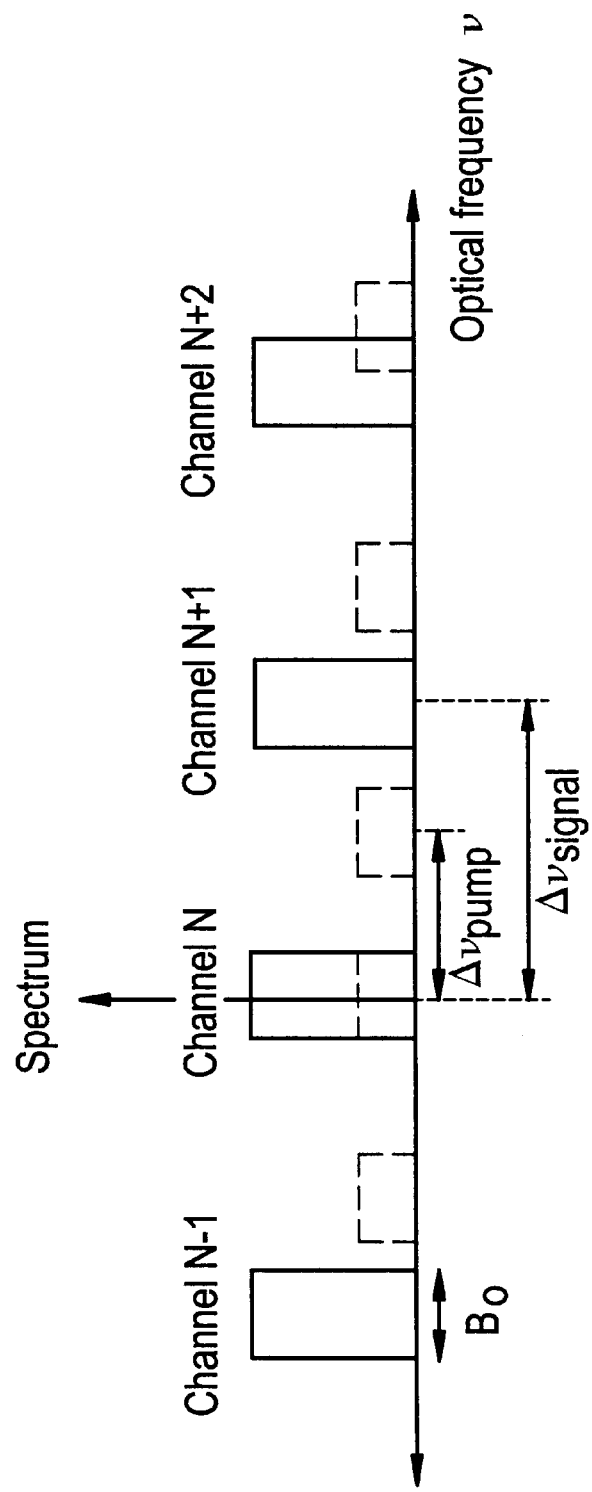
FIG. 6 is graph of the channel spectrum vs. optical frequency in a WDM system.

In FIG. 6, the spectrum of WDM channels is shown in solid lines, and the broadened DRBS spectrum created by channel N is indicated in dashed lines. In a WDM system with a channel spacing $\Delta v_{sig}$, and with a pump with a mode spacing $\Delta v_{pump}$, the ideal case is one where $|m\Delta v_{pump} - n\Delta v_{sig}| > B_O$, for any non-zero integers m and n, where $B_O$ is the optical bandwidth of the signal. $B_O$ depends on bit rate and modulation format. Typically, $B_O \cong 1.6 \times$ bit rate for NRZ, and could range from about 0.8 to 3 times bit rate in typical systems. In practical application, a desirable alternative would be one with values for $|m|$ and $|n|$ at which the above inequality ceases to be true (i.e., where $|m\Delta v_{pump} - n\Delta v_{sig}|$ is less than or equal to $B_O$) that are larger or equal to $\Delta v_{sig}/B_O$). In another alternative, we would want $\Delta v_{pump} < B_O$.

Similar but reversed reasoning can be applied toward bidirectional or Raman post-amplified systems. There, too, signal has to co-propagate with the pump and, if the walk-off is too small, is bound to be modulated by the variations of the pump power. By properly choosing the dispersion properties/map or the pump wavelength, the walk-off may be increased; this reduces the system impairment by limiting the bandwidth of the noise transferred from the pump by $1/\tau_{walk-off}$. In particular, positions symmetric around $\lambda_0$ preferably should be avoided, and pump mode spacing should exceed $1/\tau_{walk-off}$. Alternatively, pump bandwidth should be less than the optical bandwidth of the signal $B_O$.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A distributed Raman amplification system comprising
   a transmission fiber, and
   a pump laser coupled to said fiber,
   where the fiber and the pump laser are chosen so as to have characteristics which result in broadening of the DRBS spectrum and wherein the pump light counter-propagates with respect to the signal.

2. The system of claim 1 wherein such characteristic of the fiber include a wavelength $\lambda_o$ at which dispersion in the fiber is zero, and such characteristic of the pump laser include the wavelength $\lambda_p$ of the pump light.

3. The system of claim 2 wherein $\lambda_s$ and $\lambda_p$ lie on opposite sides of the wavelength $\lambda_o$.

4. The system of claim 3 wherein said fiber is a large effective area fiber.

5. A distributed Raman amplification system comprising
   a transmission fiber, and
   a pump laser coupled to said fiber,
   where the fiber and the pump laser are chosen so as to have characteristics which result in broadening of the DRBS spectrum, wherein such characteristic of the fiber include a wavelength $\lambda_o$ at which dispersion in the fiber is zero, and such characteristic of the pump laser include the wavelength $\lambda_p$ of the pump light, and $\lambda_s$ and $\lambda_p$ lie on opposite sides of the wavelength $\lambda_o$, and wherein the pump light counter-propagates with respect to the signal.

6. A distributed Raman amplification system comprising
   a transmission fiber, and
   a pump laser coupled to said fiber,
   where the fiber and the pump laser are chosen so as to have characteristics which result in broadening of the DRBS spectrum, and such characteristic of the fiber include a wavelength $\lambda_o$ at which dispersion in the fiber is zero, and such characteristic of the pump laser include the wavelength $\lambda_p$ of the pump light, and wherein the pump bandwidth is larger than the signal bandwidth.

7. A distributed Raman amplification system comprising
   a transmission fiber, and
   a source of pump light which propagates in said fiber,
   where the fiber and the pump light are chosen so as to have characteristics which result in broadening of the DRBS spectrum and wherein the pump bandwidth is larger than the signal bandwidth.

8. A distributed Raman amplification system comprising
   a transmission fiber, and
   a source of pump light which propagates in said fiber,
   where the fiber and the pump light are chosen so as to have characteristics which result in broadening of the DRBS spectrum and wherein the pump light counter-propagates with respect to the signal.

9. A distributed Raman amplification system comprising
   a transmission fiber, and
   a source of pump light which propagates in said fiber,
   where the fiber and the pump light are chosen so as to have characteristics which result in broadening of the DRBS spectrum and wherein said system is a Raman amplification system for a WDM optical fiber communication system having a WDM channel spacing, and $|m\Delta v_{pump} - n\Delta v_{sig}|$ less than or equal to $B_O$ only for $|m|$ and $|n|$ larger than $\Delta v_{sig}|B_O$, where m and n are non-zero integers, $\Delta v_{pump}$ is pump mode spacing, $\Delta v_{sig}$ is WDM channel spacing, and $B_O$ is optical bandwidth of the signal channel.

* * * * *